US008649902B2

(12) United States Patent
Takahashi

(10) Patent No.: US 8,649,902 B2
(45) Date of Patent: Feb. 11, 2014

(54) TRANSPORT MEDIUM DRIVING DEVICE, TRANSPORT MEDIUM DRIVING METHOD, PROGRAM PRODUCT, AND IMAGE FORMING APPARATUS

(75) Inventor: Minoru Takahashi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 329 days.

(21) Appl. No.: 13/234,863

(22) Filed: Sep. 16, 2011

(65) Prior Publication Data

US 2012/0072015 A1 Mar. 22, 2012

(30) Foreign Application Priority Data

Sep. 16, 2010 (JP) ................................ 2010-208615

(51) Int. Cl.
*G06F 7/00* (2006.01)

(52) U.S. Cl.
USPC ........................................................ 700/229

(58) Field of Classification Search
USPC ........................................ 700/229, 228, 213
See application file for complete search history.

(56) References Cited

U.S. PATENT DOCUMENTS 8,342,517 B2 * 1/2013 Kinoshita et al. ............ 271/228
2007/0126837 A1 6/2007 Takahashi et al.
2009/0234498 A1 9/2009 Takahashi et al.
2010/0034565 A1 2/2010 Ashikawa et al.
2010/0156041 A1 * 6/2010 Ruhk et al. .................... 271/227
2011/0049794 A1 * 3/2011 Kinoshita et al. ............. 271/227
2011/0156341 A1 * 6/2011 Fujita ......................... 271/10.11
2011/0175281 A1 7/2011 Takahashi

FOREIGN PATENT DOCUMENTS

JP 10-260734 9/1998
JP 2003-97940 4/2003
JP 2005-84209 3/2005
JP 3978837 7/2007
JP 2009-55671 3/2009
JP 2009-183132 8/2009

* cited by examiner

*Primary Examiner* — Ramya Burgess

(74) *Attorney, Agent, or Firm* — Oblon, Spivak, McClelland, Maier & Neustadt, L.L.P.

(57) ABSTRACT

A transport medium driving device is provided with a transport unit that transports a sheet-shaped transport medium on which an image is formed by an image forming unit, a position detecting unit that detects the position of the sheet-shaped transport medium, a positional deviation acquiring unit that acquires a positional deviation between the detected position and a predetermined target position at a predetermined interval, a correcting unit that corrects the positional deviation on the basis of a correction amount for correcting a positional displacement between the sheet-shaped transport medium and the image formed on the sheet-shaped transport medium, a control unit that controls a transport speed of the sheet-shaped transport medium on the basis of the corrected positional deviation, and a determining unit that determines whether a correction operation is converged on the basis of a variation in the positional deviation over time.

10 Claims, 9 Drawing Sheets

TRANSPORT MEDIUM DRIVING DEVICE, TRANSPORT MEDIUM DRIVING METHOD, PROGRAM PRODUCT, AND IMAGE FORMING APPARATUS

CROSS-REFERENCE TO RELATED APPLICATIONS

The present application claims priority to and incorporates by reference the entire contents of Japanese Patent Application No. 2010-208615 filed in Japan on Sep. 16, 2010.

BACKGROUND OF THE INVENTION

1. Field of the Invention

The present invention relates to a transport medium driving device, a transport medium driving method, and a program product for driving a sheet-shaped transport medium, and an image forming apparatus.

2. Description of the Related Art

In recent years, there is an increasing demand for a production printing system that provides various kinds of high quality images in a small lot size. In the electrophotographic image forming apparatus used in the production printing system, an electrostatic latent image is formed on a photosensitive element by optical writing and is developed into a toner image. The toner image is transferred onto a sheet and is then fixed by, for example, heat or pressure. In this way, an image is formed on the sheet.

In some of the typical full color image forming apparatuses, the toner image is transferred onto an intermediate transfer body, such as an intermediate transfer belt or an intermediate transfer drum, and then a color image is formed. That is, an operation of transferring the toner image onto the intermediate transfer body (i.e. the primary transfer) is performed on each color to superimpose the toner images of a plurality of colors on the intermediate transfer body. Then, a color toner image is transferred from the intermediate transfer body to a sheet (i.e. the secondary transfer). Then, the color toner image-on the sheet is fixed. In this way, a color image is obtained.

In the image forming apparatus that forms a full color image, a secondary transfer unit that transfers the toner image on the intermediate transfer body to the sheet includes a sheet transport unit. In the image forming apparatus, during the transfer of the toner image to the sheet, if there is a difference between the time when the toner image reaches the transfer unit and the time when the sheet reaches the transfer unit, a deviation occurs in the image formed on the sheet, which causes a reduction in image quality.

The deviation of the image during transfer occurs due to various factors. For example, the image deviation occurs due to a slip between the roller of the sheet transport unit and the sheet or a slip between the intermediate transfer body and a roller for driving the intermediate transfer body. In addition, the image deviation occurs due to, for example, a variation in the length of a sheet transport path caused by the deformation of a component, which occurs due to a change in temperature and humidity or a variation over time, and a variation in the sheet transport speed or the amount of transport due to a change in the diameter of the sheet transport roller. Further, the image deviation occurs due to, for example, an error in the detection system that detects the position or speed of the sheet.

Japanese Patent No. 3978837 discloses an image forming apparatus that includes a sensor which detects the position of a sheet on an image carrier and a sensor which detects the time when the sheet passes and controls the rotational speed of a roller of a sheet transport unit on the basis of the detection result. According to the technique disclosed in Japanese Patent No. 3978837, the image and the sheet can timely reach the transfer position of the image, without being affected by the expansion and contraction or slip of an image carrier belt.

In Japanese Patent No. 3978837, the speed of the sheet is changed by a predetermined speed profile such that the image and the sheet timely reach the transfer position. In the method disclosed in Japanese Patent No. 3978837, the image and the sheet can timely reach the transfer position. However, after the operation of making the image and the sheet timely reach the transfer position, a process of determining whether or not the operation of a sheet transport control system including the sheet is converged is not performed. When the sheet enters the secondary transfer unit without convergence of the operation of the sheet transport control system, that is, without removing the positional deviation or vibration of the sheet transport control system, after the timing of the image and the sheet is adjusted, there is a concern that, for example, density irregularity, image deviation, or a magnification error will occur, which results in a reduction in image quality.

In order to solve the problems, it is considered that a transport mechanism is driven without being vibrated in the sheet transport control system. However, in this case, the gradient of the speed profile is reduced and it takes a long time to make the image and the sheet timely reach the transfer position, which results in a low printing speed. In addition, the transport distance of the sheet needs to increase, which results in an increase in the size of the apparatus.

SUMMARY OF THE INVENTION

It is an object of the present invention to at least partially solve the problems in the conventional technology.

According to an aspect of the present invention, there is provided a transport medium driving device includes a transport unit that transports a sheet-shaped transport medium on which an image is formed by an image forming unit, a position detecting unit that detects the position of the sheet-shaped transport medium transported by the transport unit, a positional deviation acquiring unit that acquires a positional deviation between the position detected by the detecting unit and a predetermined target position at a predetermined time interval or at a predetermined positional interval, a correcting unit that corrects the positional deviation on the basis of a correction amount for correcting a positional displacement between the sheet-shaped transport medium and the image formed on the sheet-shaped transport medium, a control unit that controls a transport speed of the sheet-shaped transport medium by the transport unit on the basis of the positional deviation corrected by the correcting unit, and a determining unit that determines whether a correction operation of the correcting unit is converged on the basis of a variation in the positional deviation over time.

According to an aspect of the present invention, there is provided an image forming apparatus includes the transport medium driving device mentioned above, and the image forming unit that forms an image on the sheet-shaped transport medium transported by the transport unit.

According to an aspect of the present invention, there is provided a transport medium driving method includes detecting the position of a sheet-shaped transport medium which is transported by a transport unit and on which an image is formed by an image forming unit, by using a position detecting unit, acquiring a positional deviation between the position detected in the detecting of the position and a predetermined target position at a predetermined time interval or at a predetermined positional interval, by using a positional deviation acquiring unit, correcting the positional deviation on the basis of a correction amount for correcting a positional displacement between the sheet-shaped transport medium and the image formed on the sheet-shaped transport medium, by using a correcting unit, and determining whether a correction operation in the correcting of the positional deviation is converged on the basis of a variation in the positional deviation over time, by using a determining unit.

According to an aspect of the present invention, there is provided a computer program product comprising a non-transitory computer-readable medium having computer-readable program codes embodied in the medium for transporting a sheet-shaped transport medium. The program codes when executed causing a computer to execute detecting the position of a sheet-shaped transport medium which is transported by a transport unit and on which an image is formed by an image forming unit, acquiring a positional deviation between the position detected in the detecting of the position and a predetermined target position at a predetermined time interval or at a predetermined positional interval, correcting the positional deviation on the basis of a correction amount for correcting a positional displacement between the sheet-shaped transport medium and the image formed on the sheet-shaped transport medium, and determining whether a correction operation in the correcting of the positional deviation is converged on the basis of a variation in the positional deviation over time.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
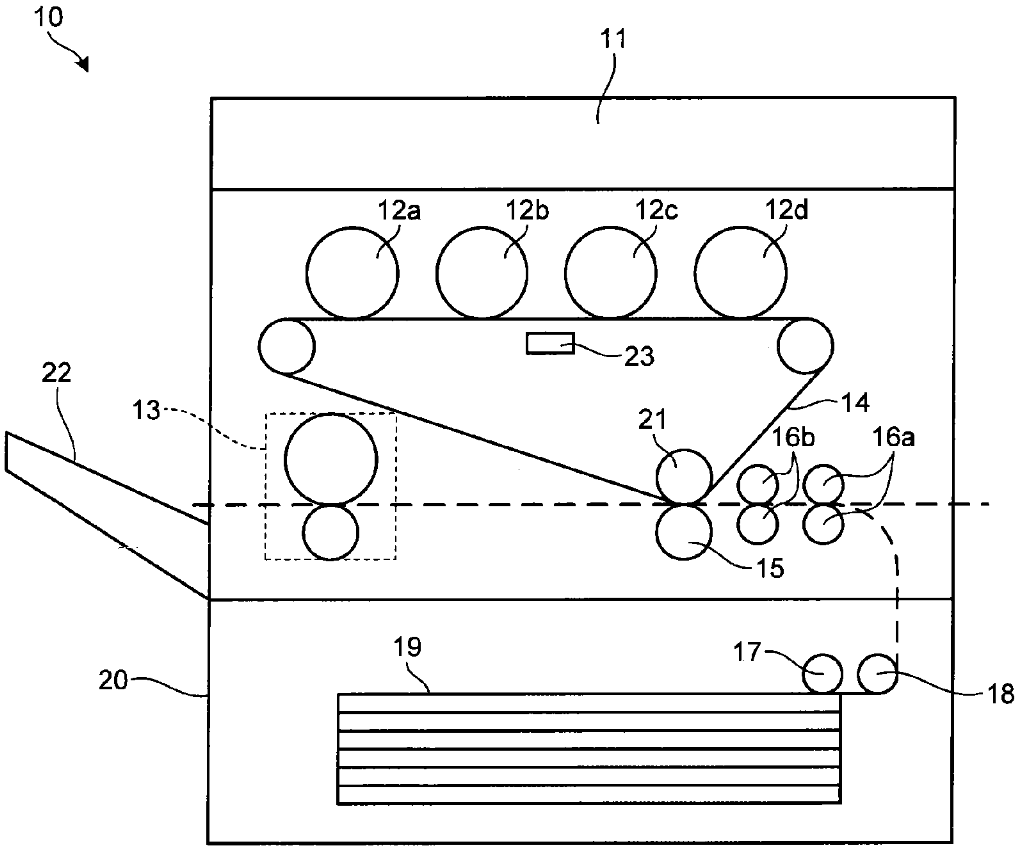
FIG. 1 is a diagram illustrating an example of a structure of an image forming apparatus applicable to various embodiments of the invention.

Hereinafter, a detail explanation will be made on embodiments of an image forming apparatus according to the present invention, with reference to the accompanying drawings. FIG. 1 is a diagram illustrating an example of a structure of an image forming apparatus 10 applicable to various embodiments of the invention. The image forming apparatus 10 includes a scanner unit 11, photosensitive element units 12*a* to 12*d*, a fixing unit 13, an intermediate transfer belt 14, a secondary transfer roller 15, a pair of registration rollers 16*a*, a pair of transfer timing control rollers 16*b*, a feed roller 17, a sheet transport roller 18, a transfer sheet 19, a feed unit 20, a repulsive roller 21, a sheet discharge unit 22, and an intermediate transfer scale detection sensor 23.

The scanner unit 11 reads the image of a document placed on the upper surface of a platen. The photosensitive element units 12*a* to 12*d* correspond to four colors respectively, that is, Yellow (Y), Cyan (C), Magenta (M), and black (K). Each unit includes a photosensitive element drum serving as a latent image carrier, a photosensitive element cleaning roller, and so on. Unless otherwise noted about specific color, hereinafter, the units 12*a* to 12*d* may be merely referred to as the unit 12.

The fixing unit 13 fixes a transferred toner image onto the transfer sheet 19, which is a sheet-shaped transport medium. The intermediate transfer belt 14 superimposes the images of each color formed by the photosensitive element units 12*a* to 12*d* and transfers the superimposed image onto the transfer sheet 19. The secondary transfer roller 15 transfers the image on the intermediate transfer belt 14 onto the transfer sheet 19. The pair of registration rollers 16*a* performs a transport and a skew correction of the transfer sheet 19, for example. The pair of transfer timing control rollers 16*b* controls the transport timing of the transfer sheet 19. The feed roller 17 feeds the transfer sheet from the feed unit 20 to the transport unit. The sheet transport roller 18 transports the transfer sheet 19 fed from the feed roller 17 to the pair of registration rollers 16*a*.

The feed unit 20 includes the transfer sheets 19 loaded thereon. The repulsive roller 21 is arranged so as to face the secondary transfer roller 15 and generates and maintains a nip between the intermediate transfer belt 14 and the secondary transfer roller 15. The sheet discharge unit 22 discharges the transfer sheet having an image transferred and fixed thereto. The intermediate transfer scale detection sensor 23 detects the scale formed on the intermediate transfer belt 14 and generates a pulse output.

In the structure shown in FIG. 1, the transfer sheet 19 is transported from the feed unit 20 to the feed roller 17 and reaches the pair of registration rollers 16*a* through the sheet transport roller 18. When the transfer sheet 19 reaches the pair of registration rollers 16*a* and comes into contact with the pair of registration rollers 16*a*, the transport of the transfer sheet 19 is stopped once. The pair of registration rollers 16*a* is driven again at a predetermined timing based on, for example, the time when an electrostatic image starts to be formed on the photosensitive element (e.g., a time of outputting an image writing signal by a host control unit (not shown)), so that the transfer sheet 19 is transported from the pair of registration rollers 16*a* to the pair of transfer timing control rollers 16*b*.

The transport of the transfer sheet 19 is controlled by the pair of transfer timing control rollers 16*b* such that the transport speed $V_{ref}$ of the transfer sheet 19 is substantially equal to the surface speed $V_{ref\_belt}$ of the transport belt 14 and the transfer sheet 19 is transported to the secondary transfer roller 15. Then, the toner images of each color which are formed on the intermediate transfer belt 14 by the photosensitive element units 12*a* to 12*d* are transferred onto the transfer sheet 19 by the secondary transfer roller 15. In this case, a sheet detection sensor (not shown) that is provided immediately after the secondary transfer roller 15 detects the transfer sheet 19. Then, the pair of transfer timing control rollers 16*b* controls the transport speed of the transfer sheet 19 on the basis of the detection result such that the toner images are transferred to an appropriate position on the transfer sheet 19.

The transfer sheet 19 is transported from the secondary transfer roller 15 to the fixing unit 13 and the toner image transferred by the secondary transfer roller 15 is fixed to the transfer sheet 19 by the fixing unit 13. The transfer sheet 19 is discharged to the sheet discharge unit 22.

Figure 2:
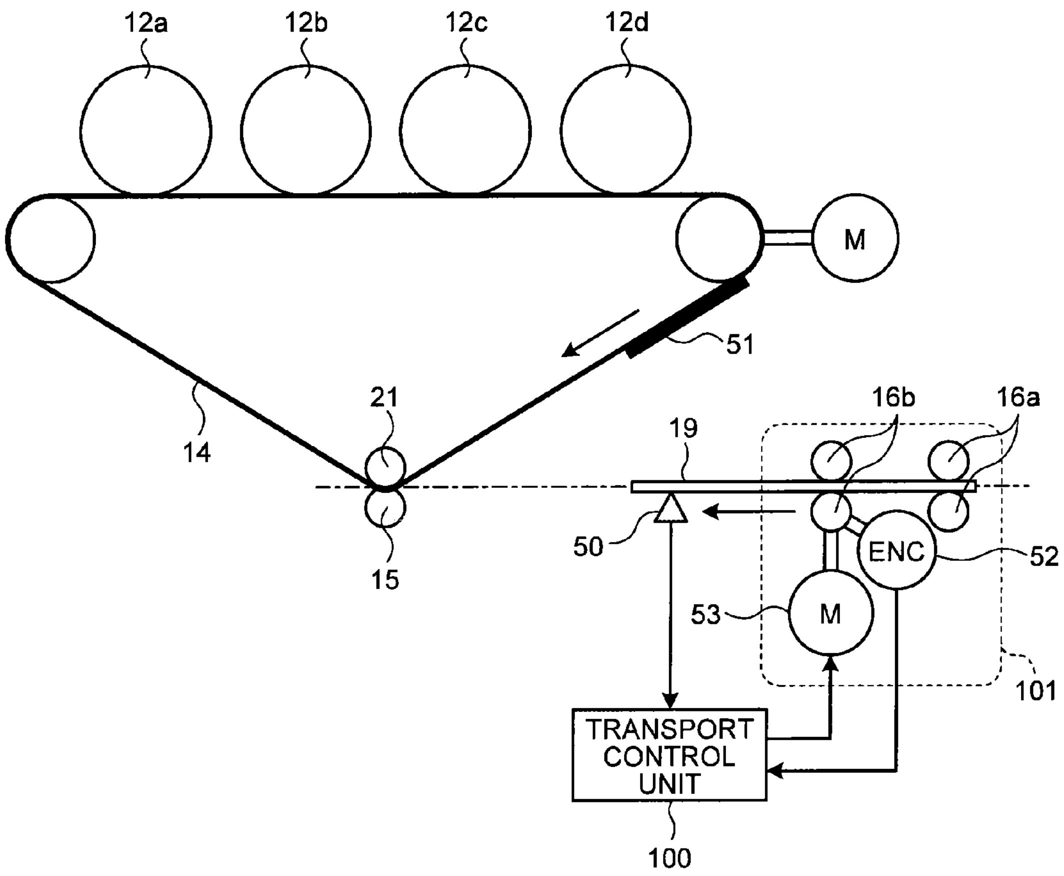
FIG. 2 is a diagram illustrating in detail a portion of the image forming apparatus that is closely related to various embodiments of the invention.

FIG. 2 shows in detail a portion of the image forming apparatus 10 shown in FIG. 1, especially relating to various embodiments of the invention. In FIG. 2, the same components as those in FIG. 1 are denoted by the same reference numerals and a detailed description thereof will not be repeated. A sheet detection sensor 50 is provided between the pair of transfer timing control rollers 16*b* and the secondary transfer roller 15. Specifically, the sheet detection sensor 50 is arranged immediately after the pair of transfer timing control rollers 16*b* in the direction in which the transfer sheet 19 is transported.

The sheet detection sensor 50 includes, for example, a light source such as a light emitting diode (LED), and a photodetector such as a photodiode. The photodetector detects the edge of the transfer sheet 19 by detecting a reflected light of a light emitted from the light source. The structure of the sheet detection sensor 50 is not limited thereto. When detecting the edge of the transfer sheet 19, the sheet detection sensor 50 outputs a detection signal indicating that the edge has been detected.

The detection signal output from the sheet detection sensor 50 is supplied to a transport control unit 100. The transport control unit 100 includes a processor for example, and controls a transport unit 101 to transport the transfer sheet 19. In addition, the transport control unit 100 may include a timer to measure the time elapsed from a predetermined trigger.

The transport unit 101 includes a rotary encoder (ENC) 52 and a motor 53, as well as the pair of registration rollers 16*a* and the pair of transfer timing control rollers 16*b* mentioned above. The motor 53 is an AC motor or a DC motor, and is driven by a motor drive (not shown) so as to be rotated at a rotational speed controlled by the transport control unit 100. The pair of transfer timing control rollers 16*b* is driven by the motor 53.

The rotary encoder 52 may be attached, for example, to a mechanistic side or an output shaft of the motor 53 to detect the rotation angle of the motor 53 at a predetermined time interval. Then, the rotary encoder 52 obtains the difference between the detect rotation angles to calculate the rotational speed of the motor 53. However, the embodiment is not limited thereto. The period of the rotary encoder 52 may be measured to calculate the rotational speed of the motor 53. For example, the period of the rotary encoder 52 may be measured by a reference clock so that the rotational speed of the motor is calculated from the period. In addition, the rotation angle of the motor 53 may be detected at a predetermined pitch distance or a predetermined positional interval of the rotary encoder 52. The rotational speed is converted into a value corresponding to the speed of the transfer sheet 19, on the basis of a reduction ratio or a roller diameter of the pair of transfer timing control rollers 16*b*, or the thickness of the transfer sheet 19, for example. And the converted value is output and supplied to the transport control unit 100.

In this embodiment, the rotary encoder 52 is used to detect the rotational speed of the motor 53, but the invention is not limited thereto. For example, a tachogenerator may be used. In this embodiment, a voltage-driven motor drive is used as the motor drive for driving the motor 53, but the invention is not limited thereto. For example, a current-driven motor drive may be used. An input to the motor driver is not particularly limited. For example, an analog value, a digital value, and a pulse width modulation (PWM) value may be used.

The transport control unit 100 calculates the transport speed of the transfer sheet 19 on the basis of the output of the rotary encoder 52. The transport control unit 100 performs feedback control on the rotational speed of the motor 53 on the basis of the transport speed of the transfer sheet 19, thereby controlling the transport of the transfer sheet 19.

The transport control unit 100 calculates a correction amount Δx for correcting the positional displacement between a toner image 51 on the intermediate transfer belt 14 and the transfer sheet 19 on the basis of the detection result of the edge of the transfer sheet 19 by the sheet detection sensor 50. The transport control unit 100 accelerates or decelerates the rotational speed of the motor 53 to control the transport of the transfer sheet 19 such that the positional displacement is corrected by the correction amount Δx while the transfer sheet 19 reaches the transfer position of the toner image, that is, the position of the secondary transfer roller 15 from the position of the sheet detection sensor 50. In the following description, the correction amount Δx is appropriately referred to as a sub-scanning registration correction amount Δx 110.

<For Method of Calculating Sub-Scanning Registration Correction Amount>

Figure 3:
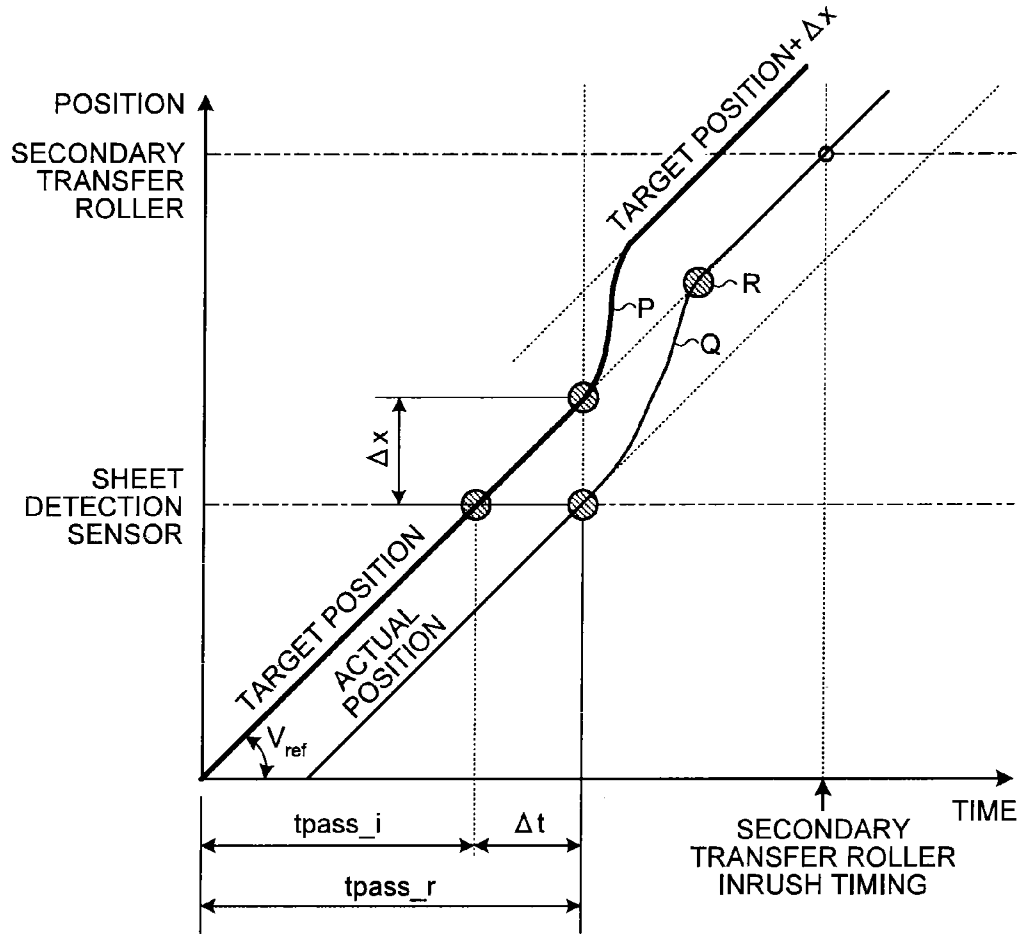
FIG. 3 is a diagram illustrating a method of calculating a sub-scanning registration correction amount.

Next, a method of calculating the sub-scanning registration correction amount will be described with reference to FIG. 3. In FIG. 3, the horizontal axis indicates time and the vertical axis indicates a position. Therefore, the gradients of a line P and a line Q represent speeds in FIG. 3. In FIG. 3, the line P indicates an example of a target position and the line Q indicates the actual position of the transfer sheet 19. The target position is the position of the transfer sheet 19 when the transfer sheet 19 is ideally transported and is calculated from, for example, the specifications of the apparatus. That is, when the transfer sheet 19 is transported to the target position, it is possible to appropriately transfer the toner image 51 on the intermediate transfer belt 14 to the transfer sheet 19.

In general, in a control system that changes the target position as in, for example, constant speed control, it is considered that a predetermined positional deviation occurs between the target position and the actual position of a control target. Therefore, FIG. 3 shows the difference between the target position and the actual position. As can be seen from FIG. 3, at the time when the transfer sheet 19 that is being actually transported is detected by the sheet detection sensor 50, the target position passes through the position of the sheet detection sensor 50 and the transport of the transfer sheet 19 is delayed.

First, the transport control unit 100 sets an ideal time period $t_{pass\_i}$ in a case of transporting the transfer sheet 19 at an ideal speed from a time when the transfer-sheet 19 starts from the reference position to a time when the sheet detection sensor 50 detects the leading edge of the transfer sheet 19. For example, the speed $V_{ref}$ that is substantially equal to the surface speed $V_{ref\_belt}$ of the intermediate transfer belt 14 may be used as the ideal speed.

The reference position is, for example, the position of the pair of registration rollers 16*a*. The ideal time $t_{pass\_i}$ is set using, for example, the start of the formation of an electrostatic image on the photosensitive element as a trigger. The value of the set deal time $t_{pass\_i}$ is stored in, for example, a register (not shown) of the transport control unit 100. The transport control unit 100 measures a real time period from a time of trigger that may be for example the start of forming the electrostatic latent image on the photosensitive element to a time when the sheet detection sensor 50 detects the leading edge of the transfer sheet 19, as measured time period $t_{pass\_r}$.

When the sheet detection sensor 50 detects the leading edge of the transfer sheet 19, the transport control unit 100 calculates a difference time period Δt, which is the difference between the measured time period $t_{pass\_r}$ and the ideal time period $t_{pass\_i}$, using the following Expression 1:

$$\Delta t = t_{pass\_r} - t_{pass\_i} \quad (1)$$

The difference time period Δt is multiplied by the ideal speed $V_{ref}$ (see Expression 2) to calculate the sub-scanning registration correction amount Δx 110 at the time when the sheet detection sensor 50 detects the leading edge of the transfer sheet 19:

$$\Delta x = \Delta t \times V_{ref} \quad (2)$$

After calculating the sub-scanning registration correction amount Δx 110 in this way, the transport control unit 100 accelerates or decelerates the transport speed of the transfer sheet 19 to correct the positional displacement by the sub-scanning registration correction amount Δx 110 until the transfer sheet 19 reaches the transfer position (secondary transfer roller 15) from the sheet detection sensor 50.

In the example shown in FIG. 3, the transfer sheet 19 is transferred at a speed that is substantially equal to the ideal speed $V_{ref}$ at the beginning, and the transport speed of the transfer sheet 19 increases immediately after the sheet detection sensor 50. When the transfer sheet 19 reaches the target position at a time R, the transport speed returns to a value that is substantially equal to the ideal speed $V_{ref}$.

First Embodiment

Figure 4:
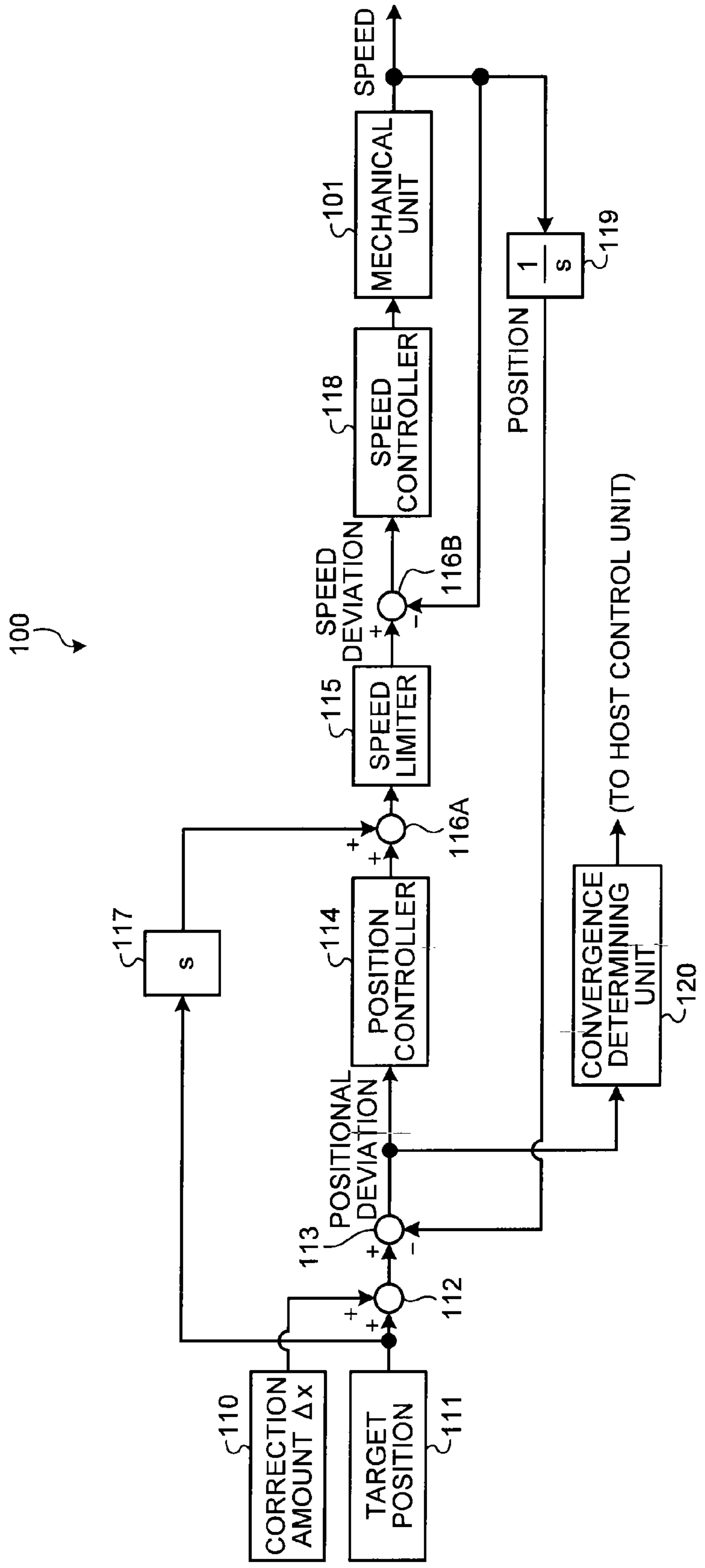
FIG. 4 is a block diagram illustrating an example of a structure of a transport control unit according to a first embodiment of the invention.

Next, a first embodiment of the invention will be described. FIG. 4 is a diagram illustrating an example of the structure of a transport control unit 100 according to the first embodiment. The transport control unit 100 is provided with a control system including a first loop to control the speed of a control target and a second loop arranged outside the first loop to control the position of the control target. The unit 100 is also provided with a convergence determining unit 120.

The first loop includes a comparator 116B, a speed controller 118, and the mechanical unit (the sheet transport unit) 101. As described above, the mechanical unit 101 includes a motor 53 as a control target. The second loop includes an adder 112, a comparator 113, a position controller 114, a speed limiter 115, a differentiator 117, an integrator 119, and an adder 116A. For example, the convergence determining unit 120 is implemented by a program that is executed on a processor of the transport control unit 100. The convergence determining unit 120 may be an independent hardware component.

The speed (hereinafter, referred to as a driving speed) that is output from the mechanical unit 101 under the control of the first loop, which will be described below, is integrated by the integrator 119 with respect to time so that a value indicating a position is obtained. The value is input to the comparator 113. The driving speed is integrated with respect to the transport time from a predetermined position and the position indicates the current position of the transfer sheet 19 relative to the predetermined position. That is, it is possible to detect the current position of the transfer sheet 19 on the basis of the value obtained by integrating the driving speed with respect to time.

A target position 111 is input from, for example, a host control unit (not shown) to the comparator 113 through the adder 112. In a case that the control target is accelerated or decelerated, or continuously moved at a constant speed, the target position changes over time, as exemplified by the line P in FIG. 3. The host control unit multiplies the ideal speed $V_{ref}$ by the transport time period for example, from a time of trigger that an electrostatic image starts to be formed on the photosensitive element. The calculated value is supplied as the target position 111.

The comparator 113 outputs a value obtained by subtracting the fed-back position from the target position 111 as the comparison result. The comparison result is output as the positional deviation between the target position 111 and the position of the transfer sheet 19 from the comparator 113. When the correction is performed with the sub-scanning registration correction amount Δx 110, the sub-scanning registration correction amount Δx 110 is input to the adder 112 to add the amount Δx 110 to the target position 111. In this way, the positional deviation is increased by the sub-scanning registration correction amount Δx 110 (when the sub-scanning registration correction amount Δx 110 is a positive value).

The positional deviation output from the comparator 113 is supplied to the position controller 114. In addition, the positional deviation is supplied to the convergence determining unit 120, which will be described in detail below. The position controller 114 performs a predetermined compensator operation on the positional deviation and outputs a speed added value corresponding to the positional deviation. The compensator operation of the position controller 114 may be performed on the basis of any control theory, such as a classical control theory, a modern control theory, or a robust control theory. For example, the position controller 114 to which a general classical control theory is applied performs proportional control (P control). In this case, in the simplest control operation, the position controller 114 may multiply the positional deviation by a proportional constant β.

The speed added value output from the position controller 114 is input to the adder 116A. In addition, a time-derivative value obtained from the differentiator 117 by differentiating the target position 111 with respect to time is input to the adder 116A. The adder 116A adds the speed added value and the time-derivative value of the target position 111 and outputs the added value.

The value output from the adder 116A is supplied to the comparator 116B through the speed limiter 115. In addition, the driving speed output from the mechanical unit 101 is input to the comparator 116B. The comparator 116B subtracts the driving speed from the value supplied through the speed limiter 115 and outputs the speed deviation, which is the difference between the driving speed and the target speed. The speed deviation is supplied to the speed controller 118.

The speed limiter 115 sets the upper limits of the speed added value in the acceleration direction and the deceleration direction. Therefore, the input speed added value is limited by the upper limits. Since the speed added value is limited by the speed limiter 115, it is possible to prevent the saturation of a control target and expect a stable operation in the speed range of the control target.

The speed controller 118 performs a predetermined compensator operation on the supplied speed deviation and outputs a value corresponding to a motor driving voltage for driving the motor 53. The compensator operation of the speed controller 118 may be performed on the basis of any control theory, such as a classical control theory, a modern control theory, or a robust control theory. For example, the speed controller 118 may perform the compensator operation based on a classical control theory, such as proportional-integral-derivative control, that is, PID control, proportional-integral control, that is, PI control, or phase compensation control.

The output of the speed controller 118 is supplied to the mechanical unit 101 and is converted into a voltage equivalent to an input by a motor driver (not shown) and the motor 53 is driven. In this way, the pair of transfer timing control rollers 16*b* is driven. The rotary encoder 52 detects the rotation angle of the motor 53, converts the detected rotation angle into a speed, and outputs the speed as the driving speed. In addition, when the motor driver for driving the motor 53 is a current driven type, the output of the speed controller is a value equivalent to a current instruction value.

The transport control unit 100 may include an analog arithmetic circuit or a digital arithmetic circuit. In addition, the transport control unit 100 may be implemented by a software operation performed by the program which is executed on a microprocessor.

<For Convergence Determining Process>

Next, a positional deviation convergence determining process of the convergence determining unit 120, which is a characteristic of the first embodiment, will be described. In the correction operation using the sub-scanning registration correction amount Δx 110, in the structure of the open loop control system driving the pair of transfer timing control rollers 16*b* with a stepping motor, the stepping motor is driven in the range in which it does not lose steps. Therefore, it is difficult to control the state of convergence, such as vibration, at the completion of the correction operation. And it is not necessary to detect the state of convergence.

In contrast, in the feedback control using a DC motor or an AC motor as in the first embodiment, an output may be delayed with respect to an input, and overshoot, residual vibration due to the control system, or micro vibration due to the mechanical system may occur. Therefore, the overshoot or vibration is detected by a detector, such as the rotary encoder 52, and is fed back. In addition, when the kind of transfer sheet 19 transported is changed, inertia applied to the mechanism for driving the pair of transfer timing control rollers 16*b* is changed. Then, the response characteristics of the control system are also changed.

Therefore, a convergence determining unit is needed which detects that the correction operation is stably performed with the sub-scanning registration correction amount Δx 110 and is then completed.

Figure 5:
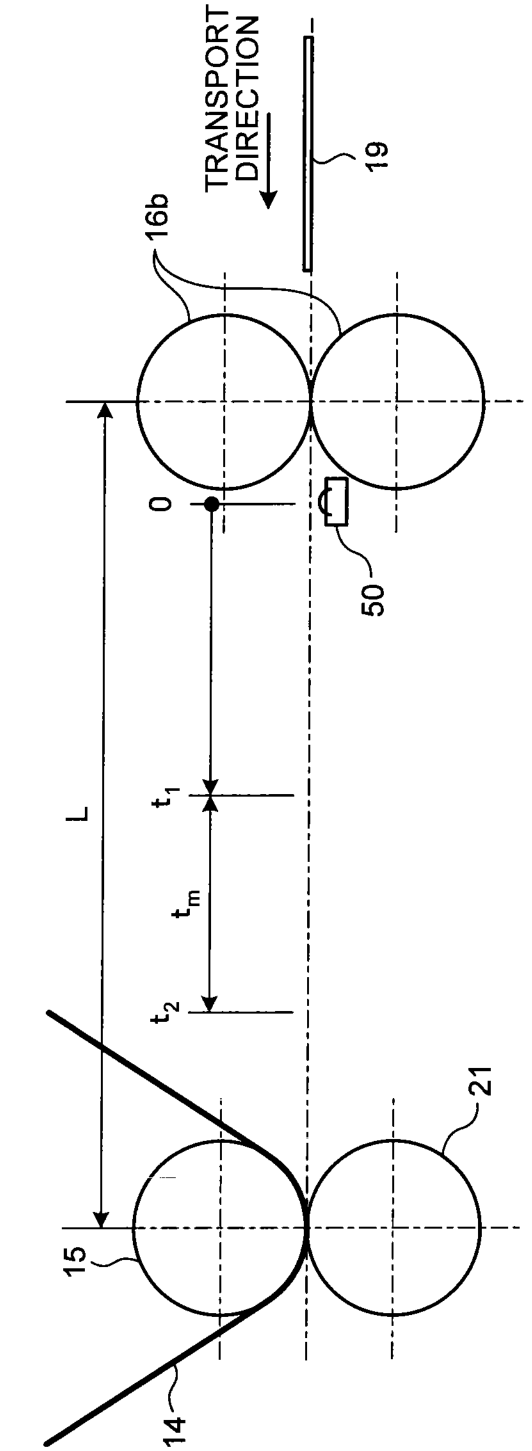
FIG. 5 is a diagram schematically illustrating the positional relation between transfer timing control roller pair and a secondary transfer roller.

Next, the convergence determining process according to the first embodiment will be conceptually described with reference to FIGS. 5 and 6. FIG. 5 is a diagram schematically illustrating the positional relation between the pair of transfer timing control rollers 16*b* and the secondary transfer roller 15. The structures of the pair of transfer timing control rollers 16*b* and the secondary transfer roller 15 are determined by the structure of the apparatus. In the example shown in FIG. 5, the distance between the pair of transfer timing control rollers 16*b* and the secondary transfer roller 15 is fixed to a distance L. The correction operation of the transport control unit 100 using the sub-scanning registration correction amount Δx 110 needs to be converged and completed during the period from the time when the sheet detection sensor 50 detects the leading edge of the transfer sheet 19 to the time when the transfer sheet 19 enters the secondary transfer roller 15.

The position where the correction operation using the sub-scanning registration correction amount Δx 110 is completed can be calculated in advance from the response characteristics of the control system. In this embodiment, it is assumed that the sheet detection sensor 50 detects the leading end of the transfer sheet 19 and the correction operation is completed after a time $t_1$ has elapsed from the start of the correction operation.

The convergence determining unit 120 samples the positional deviation during the period from the time $t_1$ to a time $t_2$, in a case that the time when the sheet detection sensor 50 detects the leading edge of the transfer sheet 19 is 0. It is assumed that a time period $t_m$ from the time $t_1$ to the time $t_2$ is longer than the response period of the control system including the first and second loops shown in FIG. 4. For example, when the response frequency of the control system is 20 Hz, $t_m$ is 50 ms (milliseconds) or more ($t_m \geq 50$ ms).

The time $t_2$ is set to, for example, a value at which the transfer sheet 19 does not come into contact with the secondary transfer roller 15 when the transfer sheet 19 is transmitted at the ideal speed $V_{ref}$ for the time $t_2$ after it is detected by the sheet detection sensor 50.

The sampling period $t_s$ of the convergence determining unit 120 to sample the positional deviation is sufficiently shorter than the response period of the control system in order to represent the response of the control system. For example, the sampling period $t_s$ is one-tenth of the response period of the control system. When the response frequency of the control system is 20 Hz, the sampling period $t_s$ is 5 ms. When it is necessary to detect micro vibration depending on the mechanism of the control system, the sampling period $t_s$ is equal to or more than at least half the vibration period of the mechanism of the control system and preferably equal to or less than one-tenth of the vibration period.

Figure 6:
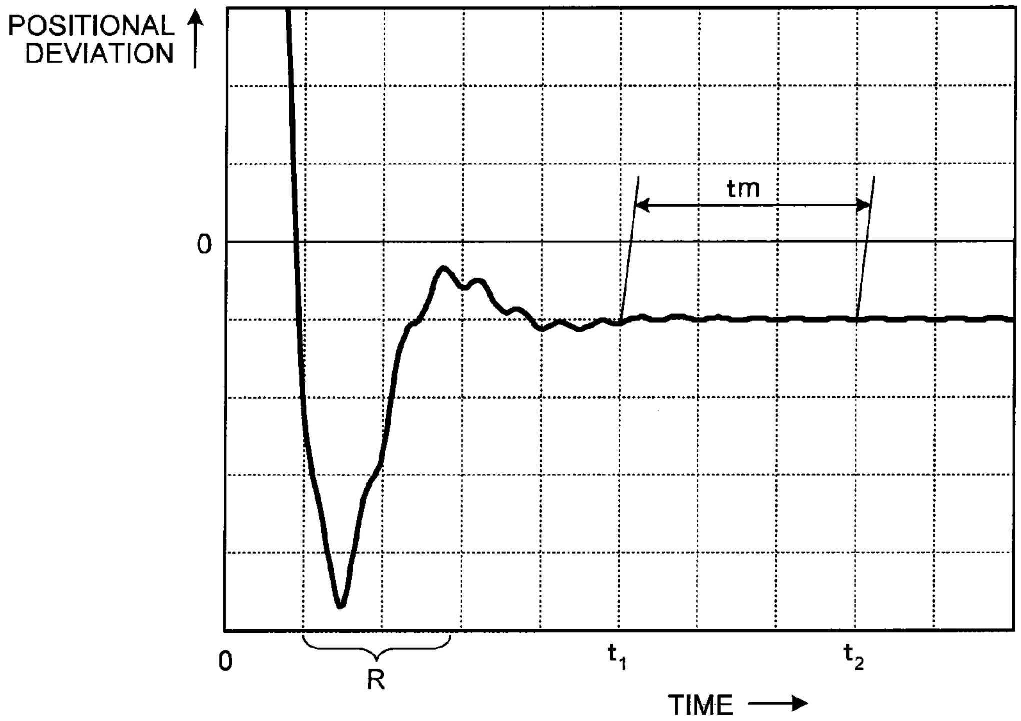
FIG. 6 is a diagram illustrating an example in which times $t_1$ and $t_2$ are applied to the response waveform of the positional deviation.

FIG. 6 is a diagram illustrating an example in which the time $t_1$ and the time $t_2$ are applied to the response waveform of the positional deviation. In FIG. 6, the vertical axis indicates a positional deviation and the horizontal axis indicates time. For example, the time $t_1$ is 0.1 s (second) and the time $t_m$=60 ms. The convergence determining unit 120 samples the positional deviation with the sampling period $t_s$ during the time $t_m$ and determines whether the correction operation using the sub-scanning registration correction amount Δx 110 is converged.

In FIG. 6, a range R corresponds to the timing R shown in FIG. 3 and indicates the timing when the transfer sheet 19 reaches the target position and the transport speed is reduced so as to be substantially equal to the ideal speed $V_{ref}$. As such, when the positional deviation increases with a change in the transport speed and then the transport speed is stabilized, the positional deviation is also stabilized and is converged on a given value. For example, the time $t_1$ and the time $t_2$ may be set by experimentally obtaining a time when the variation of the positional deviation converges within a predetermined range after the transport speed is rapidly changed.

In the first embodiment, the positional deviation is sampled from the time $t_1$ to the time $t_2$ to calculate the statistical value of the positional deviation. If the statistical value is equal to or less than a predetermined value, it is determined that the correction operation using the sub-scanning registration correction amount Δx 110 is completed and the state of the control system is converged.

Some methods are considered in order to determine whether the state of the control system is converged. In the first embodiment, any of the following statistical methods can be performed in order to determine the convergence: a first determining method based on the average value of the sampled positional deviation; a second determining method based on the result of a low-pass filter process performed on the positional deviation; and a third determining method based on the unbiased variance of the positional deviation.

First, the first determining method of determining convergence on the basis of the average value of the positional deviation will be described. The average value $ep^-$ of m positional deviation data items ep(i) which are sampled during the time period $t_m$ is calculated by the following-Expression 3:

$$ep^- = \frac{\sum_{i=0}^{i=m-1} ep(i)}{m} \tag{3}$$

When the calculated average value $ep^-$ is within a predetermined range, it may be determined that the state of the control system is converged. For example, when the allowable error of a normal positional deviation is ±100 μm and the average value $ep^-$ is within the range of the allowable error (for example, ±100 μm) with respect to the normal positional deviation, it is determined that the state of the control system is converged.

In the first determining method, it may be determined that the state of the control system is converged even when the positional deviation is minutely vibrated in the vicinity of a predetermined value. Therefore, when the control system has a structure capable of neglecting micro vibration or specifications capable of neglecting micro vibration, the first determining method may be applied.

The process of calculating the average value $ep^-$ is equivalent to a finite impulse response (FIR) filtering process that applies the same weight to sampling data. Specifically, when frequency characteristics are considered, a FIR filter that takes into account weights for each sampling data items may be used.

Next, the second determining method of determining convergence on the basis of the result of the low-pass filtering process performed on the positional deviation will be described. In the second determining method, an infinite impulse response (IIR) filter is used as the low-pass filter. When the IIR filter is represented by a discrete state equation and an output equation, the following Expressions 4 and 5 are obtained:

$$x(k+1)=a_d \cdot x(k)+b_d \cdot u(d) \tag{4}$$

$$y(k)=c_d \cdot x(k)+d_d \cdot u(k) \tag{5}$$

In Expressions 4 and 5, constants $a_d$, $b_d$, $c_d$, and $d_d$ are filter constants that are discretized at the sampling time $t_s$. A variable u(k) is an input of sampling k and a variable y(k) is an output of the sampling k. Here, convergence is determined on the basis of the final output using m data items. In this case, when a variation in the final output is equal to or more than a predetermined value, it may be determined that the state of the control system is converged.

In the second determining method using the IIR filter, similarly to the first determining method using the FIR filter, the filter constants are designed considering the frequency characteristics. Therefore, it is possible to determine convergence without considering micro vibration in the high frequency band.

The process of calculating the average value $ep^-$ may be considered as a special low-pass filtering process. Therefore, the low-pass filtering process is also the statistical method.

Next, the third determining method of determining convergence on the basis of the unbiased variance of the positional deviation will be described. When the average value $ep^-$ calculated by Expression 3 is used, the unbiased variance $\sigma^2$ is represented by the following Expression 6:

$$\sigma^2 = \frac{\sum_{i=0}^{i=m-1} (ep(i) - ep^-)^2}{m-1} \tag{6}$$

In Expression 6, the calculated unbiased variance $\sigma^2$ is the square of a standard deviation σ. As is well known, the standard deviation σ is used to represent a variation, such as positional displacement, and the unbiased variance $\sigma^2$ calculated by Expression 6 is closer to zero as the operation is converged. Therefore, a criterion for comparison with the unbiased variance $\sigma^2$ can be set on the basis of the required accuracy of the position correcting operation. In this way, it is possible to perform a high-accuracy convergence determining operation that also determines whether residual vibration occurs. For example, in the third determining method, when the unbiased variance $\sigma^2$ calculated from the positional deviation is within a predetermined range centered around zero, which is determined as the criterion, it may be determined that the state of the control system is converged.

In the third determining method, the unbiased variance $\sigma^2$ is used. However, the standard deviation σ may be used.

Figure 7:
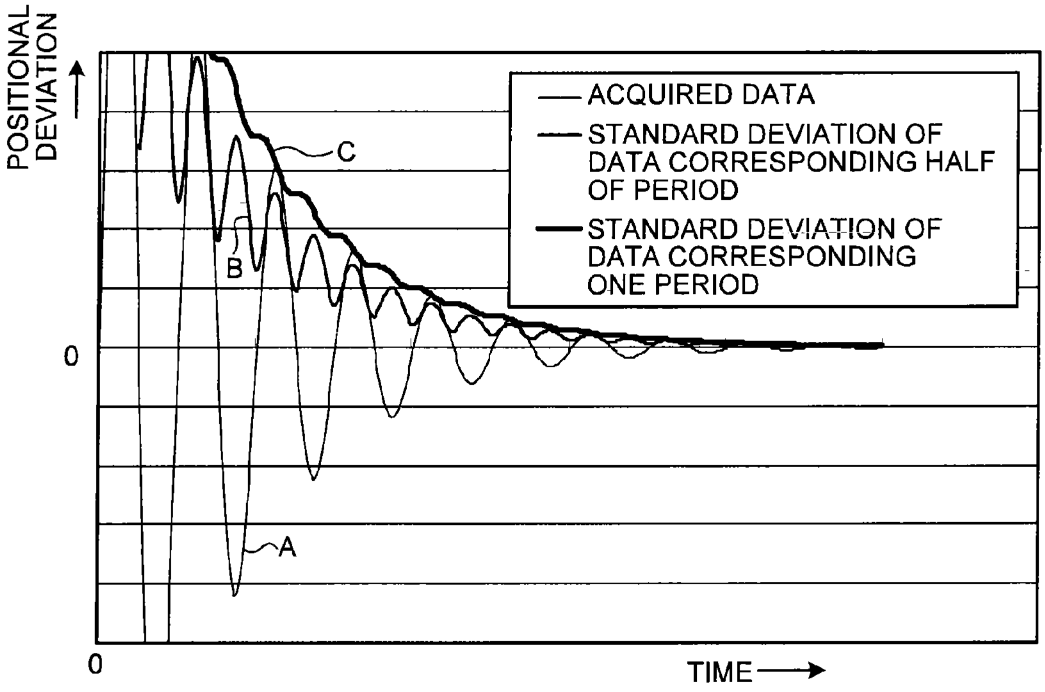
FIG. 7 is a diagram illustrating the number of sampling data items used to determine convergence using a statistical method.

The number of sampling data items used to determine convergence using the statistical method will be described with reference to FIG. 7. In FIG. 7, the vertical axis indicates a positional deviation and the horizontal axis indicates time. Incidentally, FIG. 7 shows a case that the sub-scanning registration correction amount Δx 110 is 0. As for the statistical method, the standard deviation σ of the positional deviation is employed.

In FIG. 7, a curve A indicates an example of positional deviation data acquired by sampling. A curve B indicates an example of the standard deviation a of the positional deviation data of the curve A that is calculated using positional deviation data corresponding to half the response period of the control system. A curve C indicates an example of the standard deviation a of the positional deviation data of the curve A that is calculated using positional deviation data corresponding to one response period of the control system. As described above, when the positional deviation data is not sampled with the time period $t_m$ longer than the response period of the control system, a variation occurs in the value of the standard deviation σ (or the unbiased variance σ2) used to determine convergence, as shown in the curve B. Therefore, it becomes difficult to accurately determine the convergence. On the other hand, as represented by the curve C, since the positional deviation data is sampled with the time period $t_m$ corresponding to the response period of the control system, the value of the standard deviation a used to determine the convergence is stabilized. Therefore, it is possible to accurately determine the convergence.

Next, an explanation will be made on the difference between the convergence determining method based on the first determining method using the average value and the convergence determining method based on the third determining method using the unbiased variance σ2. In the third determining method, the standard deviation σ that is the square root of the unbiased variance $\sigma^2$ is used instead of the unbiased variance $\sigma^2$.

Figure 8:
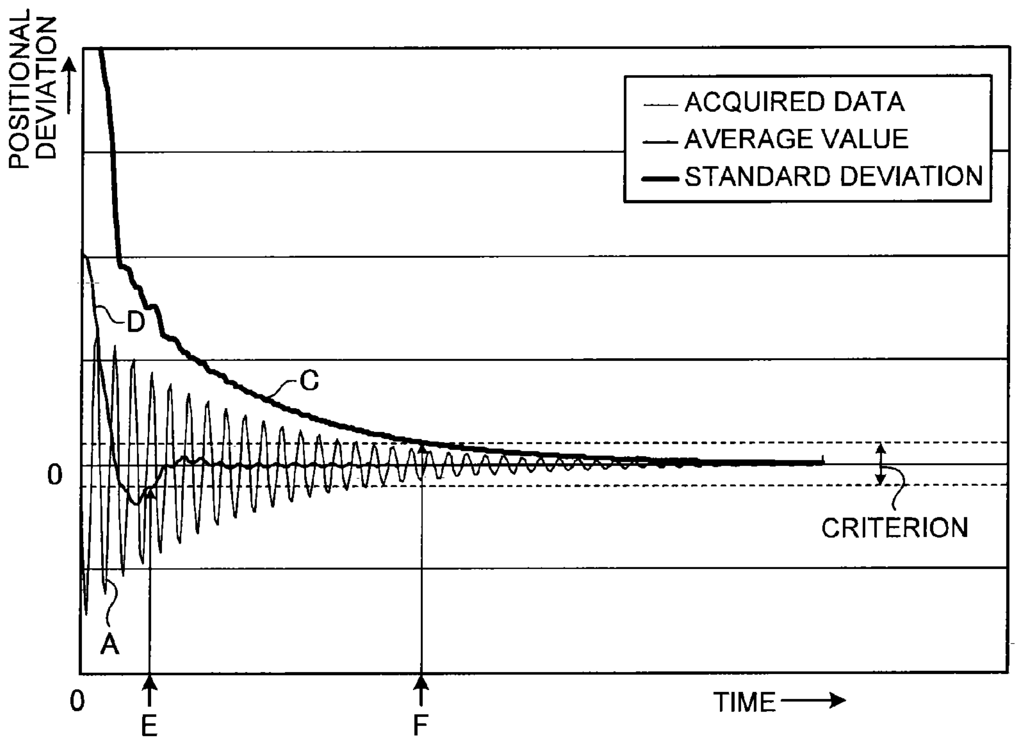
FIG. 8 is a diagram illustrating the difference between a first determining method and a third determining method.

In FIG. 8, the vertical axis indicates a positional deviation and the horizontal axis indicates time. In addition, a curve A indicates an example of positional deviation data acquired by sampling, a curve C indicates an example of the standard deviation 6 calculated for the positional deviation data indicated by the curve A, and a curve D indicates an example of the average value-$ep^-$ calculated for the positional deviation data indicated by the curve A. It is assumed that the sub-scanning registration correction amount Δx 110 is zero and the state of the control system is determined to be converged at the time when the value is within the range of the criterion.

In a case that the average value $ep^-$ is used to determine the convergence status, the positional deviation falls within the convergence determination criteria centered around a predetermined value, while the micro vibration is observed. Therefore, it may be determined that the correcting operation is converged. In the example of FIG. 8, the average value ep− falls within the determination criteria after the point E, while the positional deviation rather vibrates widely as exemplified by the line D. Thus, it is determined that the correction operation is converged.

On the other hand, in a case that the standard deviation σ is used to determine the convergence status, the line C does not fall within the convergence determination criteria until the micro vibration becomes sufficiently small. In the example of FIG. 8, the standard deviation σ falls within the determination criteria after the point F where the vibration of the positional deviation is smaller than that at the point E as exemplified by the line C. Thus, it is determined that the correction operation is converged. In this way, it is possible to determine the convergence of correction operation taking into account the micro vibration also, if the statistic method taking into account the data variation is used.

Micro vibration (mechanical resonance or periodic variation) generated by the mechanism of the image forming apparatus appears as an image error called banding. When the statistical method is applied to the convergence determining unit of the transport control unit 100, it is possible to accurately determine convergence and thus improve image quality.

Figure 9:
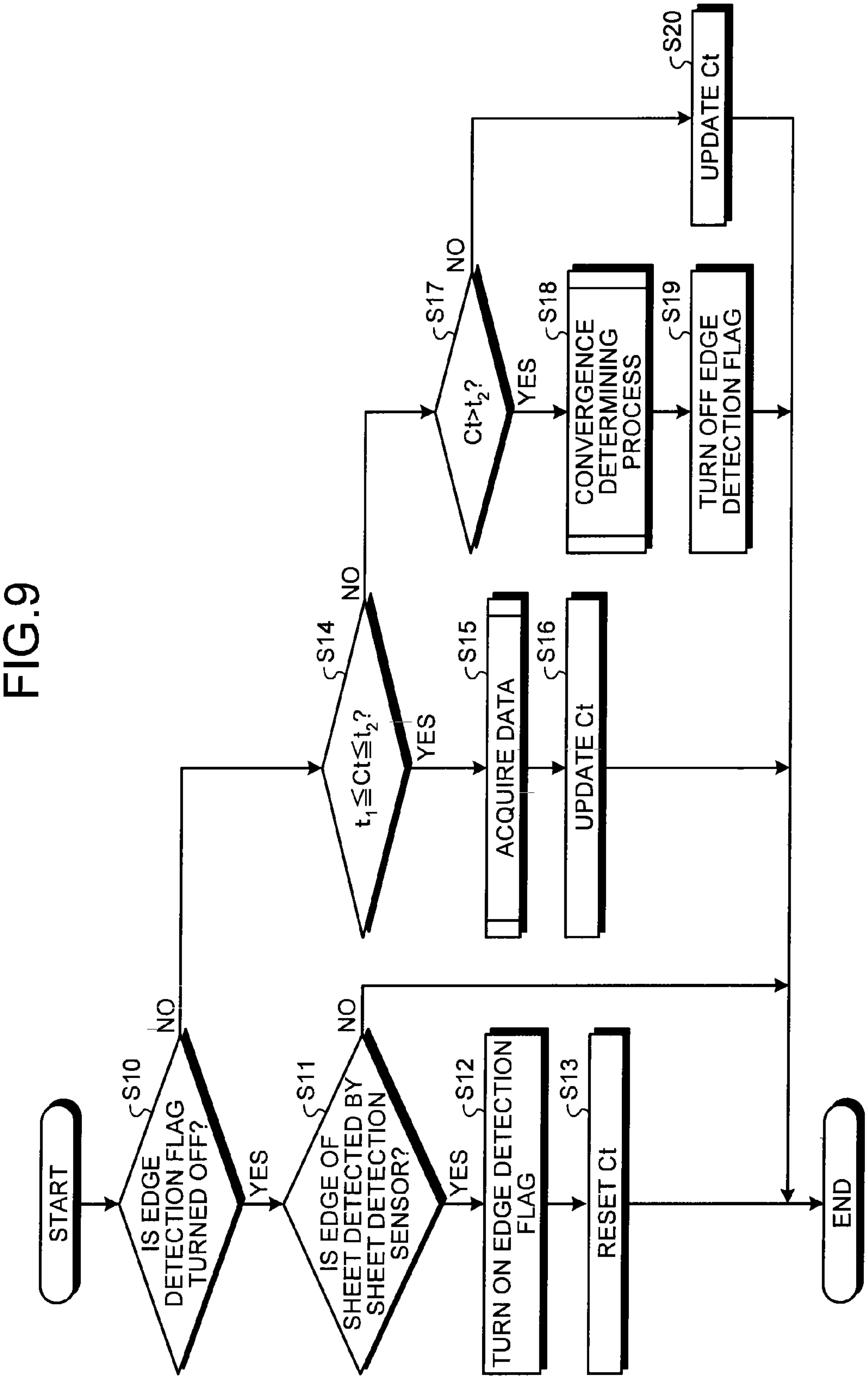
FIG. 9 is a flowchart illustrating an example of a convergence determining process according to the first embodiment of the invention.

FIG. 9 is a flowchart illustrating an example of the convergence determining process according to the first embodiment. In the flowchart, a series of processes is performed by, for example, the convergence determining unit 120 with a predetermined control period according to a program. For example, in the flowchart, a series of processes is performed with a feedback control period of 1 ms. It is preferable that the process in the flowchart is performed with, for example, a period (for example, 1 msec) shorter than the sampling period $t_s$. In addition, it is assumed that convergence is determined by the above-mentioned first or third determining method.

First, in Step S10, it is determined whether an edge detection flag is turned off. If it is determined that the edge detection flag is turned off, the process proceeds to Step S11 and it is determined whether the sheet detection sensor 50 detects the leading edge of the transfer sheet 19. If it is determined that the leading edge of the transfer sheet 19 is not detected, the series of processes in the flowchart ends.

When it is determined in Step S11 that the sheet detection sensor 50 detects the leading edge of the transfer sheet 19, the process proceeds to Step S12 and the edge detection flag is turned on. In the next Step S13, a counter that counts time is reset and a count value Ct is set to 0. Then, the series of processes in the flowchart ends. After the flowchart ends, the edge detection flag and the count value Ct are stored in, for example, a register of the processor.

When it is determined in Step S10 that the edge detection flag is turned on, the process proceeds to Step S14. In Step S14, it is determined whether the count value Ct is within the range from the time $t_1$ to the time $t_2$. If it is determined that the count value Ct is within the range, the process proceeds to Step S15 and the convergence determining unit 120 acquires positional deviation data. The acquired positional deviation data is cumulatively added and stored in, for example, the register of the transport control unit 100. Then, in Step S16, the count value Ct is updated with the current time based on the reset timing of the counter in Step S13. When the count value Ct is updated, the series of processes in the flowchart ends.

When it is determined in Step S14 that the count value Ct is beyond the range from the time $t_1$ to the time $t_2$, the process proceeds to Step S17. In Step S17, it is determined whether the count value Ct is more than the time $t_2$. If it is determined that the count value Ct is not more than the time $t_2$, the process proceeds to Step S20 and the count value Ct is updated with the current time based on the reset timing of the counter in Step S13. Then, the series of processes in the flowchart ends.

When it is determined in Step S17 that the count value Ct is more than the time $t_2$, the process proceeds to Step S18. In Step S18, the convergence determination is performed on the basis of the positional deviation data that is cumulatively added and stored in Step S15.

That is, the convergence determining unit 120 calculates the average value $ep^-$ or the unbiased variance $\sigma^2$ of the cumulatively added positional deviation data and determines whether the calculated value is within a predetermined range of the criterion for convergence. When it is determined that the calculated value is within the range of the criterion for convergence, the correction operation using the sub-scanning registration correction amount Δx 110 is converged and it is determined that the position correcting operation using the sub-scanning registration correction amount Δx is correctly completed. The determination result is transmitted to the host control unit and the process of transporting the transfer sheet 19 is continuously performed.

On the other hand, when it is determined that the calculated value is beyond the range of the criterion for convergence, the state of the control system is not converged and it is determined that the position correcting operation using the sub-scanning registration correction amount Δx is not correctly completed. When the determination result is transmitted to the host control unit, the host control unit performs, for example, a process of displaying information indicating that image quality is likely to be reduced on a display unit (not shown) or a process of stopping a printing operation including the transport of the transfer sheet 19 due to an error in the operation.

When the convergence determining process is performed in Step S18, the process proceeds to Step S19 and the edge detection flag is turned off. Then, the series of processes in the flowchart ends.

As such, in the first embodiment, it is determined whether the correction operation using the sub-scanning registration correction amount Δx 110 is converged. Therefore, it is possible to form a high-quality-color image. In addition, the convergence determination is performed on the basis of the positional deviation data which is obtained by the feedback loop for position control. Therefore, the speed of the image forming operation is not reduced.

Second Embodiment

Figure 10:
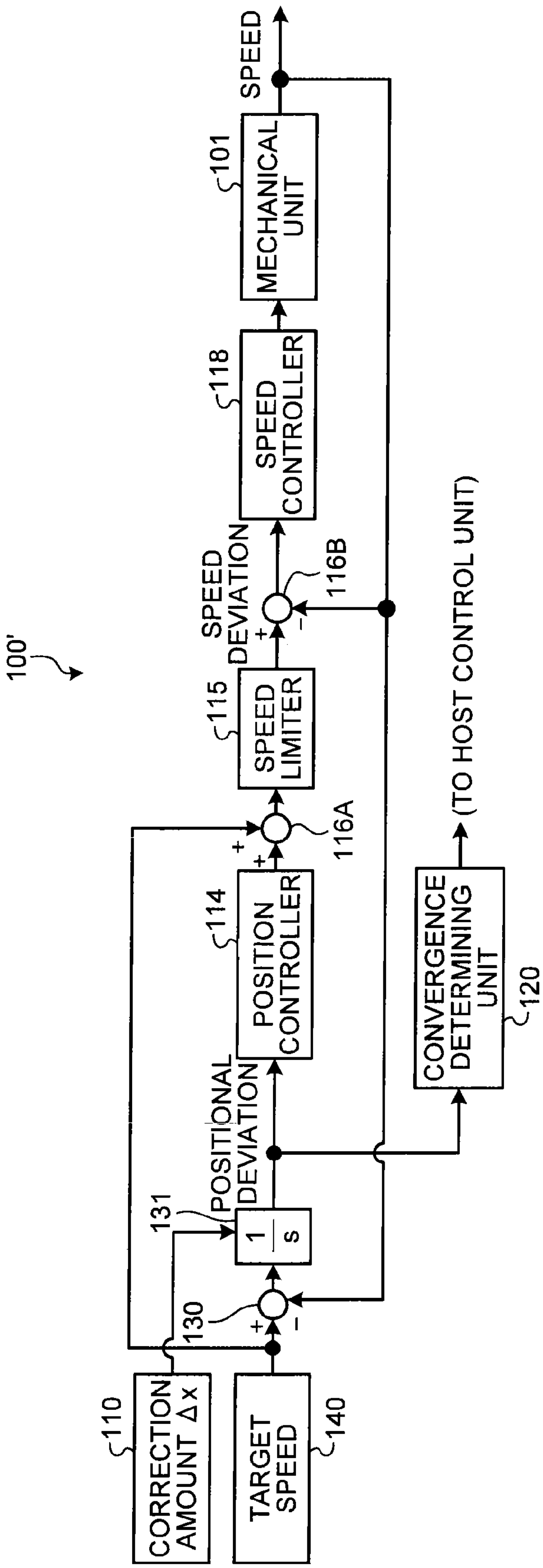
FIG. 10 is a block diagram illustrating an example of a structure of a transport control unit according to a second embodiment of the invention.

Next, a second embodiment of the invention will be described. FIG. 10 is a diagram illustrating an example of the structure of a transport control unit 100' according to the second embodiment. The transport control unit 100 shown in FIG. 4 uses a target value related to a position as the input value. However, in the second embodiment, a target value related to a speed is used as the input value. The transport control unit 100' differs from the transport control unit 100 shown in FIG. 4 in that a target speed 140 is input and the sub-scanning registration correction amount Δx 110 is input to an integrator 131. In FIG. 10, the same components as those in FIG. 4 are denoted by the same reference numerals and a detailed description thereof will not be repeated.

The transport control unit 100' includes a first loop that controls the speed of a control target, a second loop that controls the position of the control target, and a convergence determining unit 120. The first loop includes a comparator 116B, a speed controller 118, and a mechanical unit 101, similarly to FIG. 4. The second loop includes a comparator 130, an integrator 131, a position controller 114, a speed limiter 115, and an adder 116A.

The driving speed output from the mechanical unit 101 by the control of the first loop is input to the comparator 130. The target speed 140 is input from, for example, a host control unit (not shown) to the comparator 130. The target speed is the gradient of a variation in the target position over time (line P) which is described with reference to FIG. 3 and is, for example, an ideal speed $V_{ref}$.

The comparator 130 outputs a value obtained by subtracting a fed-back driving speed from the target speed 140 as the comparison result. The comparison result is supplied to the integrator 131, is integrated, and becomes a positional deviation. When a correction operation using the sub-scanning registration correction amount Δx 110 is performed, the sub-scanning registration correction amount Δx 110 is supplied to the integrator 131 and is added to the integrated value of the comparison result to obtain a positional deviation.

When the sub-scanning registration correction amount Δx 110 is added to the integrated value, the positional deviation is increased by the sub-scanning registration correction amount Δx 110 (when the sub-scanning registration correction amount Δx 110 is a positive value) and the speed deviation instantaneously increases. Then, the driving speed increases, the transfer sheet 19 reaches the target position. The first and second loops are operated by feedback control so as to return the increased driving speed to the target speed 140.

The positional deviation output from the comparator 130 is supplied to the position controller 114. The position controller 114 performs a predetermined compensator operation on the positional deviation and outputs a speed added value corresponding to the positional deviation.

The speed added value output from the position controller 114 is input to the adder 116A. In addition, the target speed 140 is input to the adder 116A. The adder 116A adds the speed added value and the target speed 140 and outputs the added value.

The output of the adder 116A is supplied to the comparator 116B through the speed limiter 115. The comparator 116B outputs a value obtained by subtracting the driving speed from the output of the adder 116A as the speed deviation between the driving speed and the target speed. The speed deviation is supplied to the speed controller 118 and a predetermined compensator operation is performed on the speed deviation. Then, the speed deviation is output as a value equivalent to a motor driving voltage for driving a motor 53. The output of the speed controller 118 is supplied to the mechanical unit 101 and is converted into a voltage equivalent to the input by a motor driver (not shown). Then, the motor 53 is driven. In this way, the pair of transfer timing control rollers 16*b* is driven. A rotary encoder 52 detects the rotation angle of the motor 53, converts the detected rotation angle into a speed, and outputs the speed as the driving speed.

The positional deviation output from the comparator 130 is also supplied to the convergence determining unit 120. The convergence determining unit 120 determines whether the correction operation using the sub-scanning registration correction amount Δx 110 is converged using any one of the first to third determining processes which are described in the first embodiment. The convergence determining process of the convergence determining unit 120 is the same as that described with reference to FIGS. 5 to 9 in the first embodiment and thus a detailed description thereof will not be repeated.

As such, even when the target speed 140 is input as the target value to the transport control unit 100', it is possible to determine whether the correction operation using the sub-scanning registration correction amount Δx 110 is converged.

According to the present invention, it is possible to form a high quality color image at a high speed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A transport medium driving device comprising:

a transport unit that transports a sheet-shaped transport medium on which an image is formed by an image forming unit;

a position detecting unit that detects the position of the sheet-shaped transport medium transported by the transport unit;

a positional deviation acquiring unit that acquires a positional deviation between the position detected by the detecting unit and a predetermined target position at a predetermined time interval or at a predetermined positional interval;

a correcting unit that corrects the positional deviation on the basis of a correction amount for correcting a positional displacement between the sheet-shaped transport medium and the image formed on the sheet-shaped transport medium;

a control unit that controls a transport speed of the sheet-shaped transport medium by the transport unit on the basis of the positional deviation corrected by the correcting unit; and a determining unit that determines whether a correction operation of the correcting unit is converged on the basis of a variation in the positional deviation over time.

2. The transport medium driving device according to claim 1, wherein the determining unit performs a statistical process on the variation in the positional deviation over time and determines whether the correction operation is converged on the basis of a statistical value obtained by the statistical process.

3. The transport medium driving device according to claim 2, wherein the determining unit calculates an unbiased variance of the positional deviation within a predetermined period and determines that the correction operation is converged when the calculated unbiased variance is within a predetermined range centered around zero.

4. The transport medium driving device according to claim 2, wherein the determining unit calculates an average value of the positional deviation within a predetermined period and determines that the correction operation is converged when the calculated average value is within an allowable error range of a normal positional deviation.

5. The transport medium driving device according to claim 2, wherein the determining unit performs a low-pass filtering process on the positional deviation within a predetermined period and determines that the correction operation is converged when a variation in the result of the low-pass filtering process is less than a predetermined value.

6. The transport medium driving device according to claim 1, wherein the positional deviation acquiring unit acquires the positional deviation by subtracting an integrated value of the transport speed of the sheet-shaped transport medium by the transport unit from the sum of the target position and the correction amount used for the correction by the correcting unit.

7. The transport medium driving device according to claim 1, wherein the positional deviation acquiring unit acquires the positional deviation by adding the correction amount used for the correction by the correction unit to an integrated value of a value obtained by subtracting the transport speed of the sheet-shaped transport medium by the transport unit from the predetermined target speed.

8. An image forming apparatus comprising:

the transport medium driving device according to claim 1; and the image forming unit that forms an image on the sheet-shaped transport medium transported by the transport unit.

9. A transport medium driving method comprising:

detecting the position of a sheet-shaped transport medium which is transported by a transport unit and on which an image is formed by an image forming unit, by using a position detecting unit;

acquiring a positional deviation between the position detected in the detecting of the position and a predetermined target position at a predetermined time interval or at a predetermined positional interval, by using a positional deviation acquiring unit;

correcting the positional deviation on the basis of a correction amount for correcting a positional displacement between the sheet-shaped transport medium and the image formed on the sheet-shaped transport medium, by using a correcting unit; and determining whether a correction operation in the correcting of the positional deviation is converged on the basis of a variation in the positional deviation over time, by using a determining unit.

10. A computer program product comprising a non-transitory computer-readable medium having computer-readable program codes embodied in the medium for transporting a sheet-shaped transport medium, the program codes when executed causing a computer to execute:

detecting the position of a sheet-shaped transport medium which is transported by a transport unit and on which an image is formed by an image forming unit;

acquiring a positional deviation between the position detected in the detecting of the position and a predetermined target position at a predetermined time interval or at a predetermined positional interval;

correcting the positional deviation on the basis of a correction amount for correcting a positional displacement between the sheet-shaped transport medium and the image formed on the sheet-shaped transport medium; and determining whether a correction operation in the correcting of the positional deviation is converged on the basis of a variation in the positional deviation over time.

* * * * *